US008990460B2

United States Patent
Chang et al.

(10) Patent No.: US 8,990,460 B2
(45) Date of Patent: Mar. 24, 2015

(54) CPU INTERCONNECT DEVICE

(71) Applicant: Huawei Technologies Co., Ltd., Shenzhen (CN)

(72) Inventors: Sheng Chang, Hangzhou (CN); Rongyu Yang, Hangzhou (CN); Xinyu Hou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

(21) Appl. No.: 13/707,209

(22) Filed: Dec. 6, 2012

(65) Prior Publication Data

US 2013/0103875 A1   Apr. 25, 2013

Related U.S. Application Data

(63) Continuation of application No. PCT/CN2011/076430, filed on Jun. 27, 2011.

(51) Int. Cl.
*G06F 13/36* (2006.01)
*G06F 13/40* (2006.01)
(Continued)

(52) U.S. Cl.
CPC ............ *G06F 13/40* (2013.01); *G06F 13/4265* (2013.01); *G06F 13/4282* (2013.01);
(Continued)

(58) Field of Classification Search
CPC ........ H03M 9/00; G06F 13/385; G06F 13/40; G06F 13/4059; G06F 15/17
USPC ............. 710/70–72, 105, 305, 310–311, 313, 710/315
See application file for complete search history.

(56) References Cited

U.S. PATENT DOCUMENTS 7,334,068 B2 * 2/2008 Huff ................................ 710/71
7,721,027 B2 * 5/2010 Huff ................................ 710/71
(Continued)

FOREIGN PATENT DOCUMENTS

CN   1510892 A   7/2004
CN   1691610 A   11/2005
(Continued)

OTHER PUBLICATIONS

Oliver, Neal; "A Reconfigurable Computing System Based on a Cache-Coherent Fabric"; Intel Corporation; Jun. 10, 2012; all pages.*
(Continued)

*Primary Examiner* — Ryan Stiglic
(74) *Attorney, Agent, or Firm* — Huawei Technologies Co., Ltd.

(57) ABSTRACT

The present disclosure provides a CPU interconnect device, the CPU interconnect device connects with a first CPU, which includes a quick path interconnect QPI interface and a serial deserial SerDes interface, the quick path interconnect QPI interface receives serial QPI data sent from a CPU, converts the received serial QPI data into a parallel QPI data, and outputs the parallel QPI data to the serial deserial SerDes interface; the serial deserial SerDes interface converts the parallel QPI data output by the QPI interface into a high-speed serial SerDes data and then send the high-speed serial SerDes data to another CPU interconnect device connected with another CPU. The defects of poor scalability, long data transmission delay, and a high cost of an existing interconnect system among CPUs can be solved.

10 Claims, 13 Drawing Sheets

(51) Int. Cl.
*G06F 15/17* (2006.01)
*G06F 13/42* (2006.01)

(52) U.S. Cl.
CPC . *G06F2213/0038* (2013.01); *G06F 2213/3852* (2013.01); *G06F 15/17* (2013.01); *G06F 13/4059* (2013.01)
USPC ............. 710/70; 710/71; 710/105; 710/305; 710/310; 710/315

(56) References Cited

U.S. PATENT DOCUMENTS

| | | | |
|---|---|---|---|
| 7,801,121 B1 * | 9/2010 | Van Wageningen et al. . | 370/386 |
| 7,890,680 B2 * | 2/2011 | Huff ................................ | 710/71 |
| 8,719,843 B2 | 5/2014 | Tamir et al. | |
| 8,751,714 B2 * | 6/2014 | Safranek et al. ............. | 710/105 |
| 8,909,979 B2 * | 12/2014 | Chang et al. .................. | 714/4.5 |
| 2008/0005596 A1 | 1/2008 | Sistla et al. | |
| 2008/0071961 A1 | 3/2008 | Higuchi et al. | |
| 2008/0084862 A1 * | 4/2008 | Oliver .......................... | 370/350 |
| 2009/0083518 A1 | 3/2009 | Glew | |
| 2009/0125652 A1 * | 5/2009 | Huff ................................ | 710/71 |
| 2009/0177832 A1 * | 7/2009 | Gunzinger et al. ........... | 710/316 |
| 2011/0029734 A1 | 2/2011 | Pope et al. | |
| 2012/0079156 A1 * | 3/2012 | Safranek et al. ............. | 710/305 |
| 2013/0097455 A1 * | 4/2013 | Chang et al. ..................... | 714/3 |
| 2013/0103875 A1 | 4/2013 | Chang et al. | |
| 2014/0289434 A1 * | 9/2014 | Ranganathan et al. ....... | 710/105 |

FOREIGN PATENT DOCUMENTS

| | | |
|---|---|---|
| CN | 101634959 A | 1/2010 |
| CN | 101752288 A | 6/2010 |
| CN | 101753388 A | 6/2010 |
| CN | 101819556 A | 9/2010 |
| CN | 101833491 A | 9/2010 |
| CN | 101908036 A | 12/2010 |
| CN | 101930422 A | 12/2010 |
| WO | WO 2011/053330 A1 | 5/2011 |

OTHER PUBLICATIONS

"An Introduction to the Intel® QuickPath Interconnect"; Intel Corporation; Jan. 2009; all pages.*
International Search Report issued in corresponding PCT Patent Application No. PCT/CN2011/076430, mailed Mar. 29, 2012.
Search Report issued in corresponding Chinese Patent Application No. 201180000979.7, dated Jul. 24, 2012.

* cited by examiner

CPU INTERCONNECT DEVICE

CROSS-REFERENCE TO RELATED APPLICATIONS

This application is a continuation of International Application No. PCT/CN2011/076430, filed on Jun. 27, 2011, which is hereby incorporated by reference in its entirety.

FIELD

The embodiments of the present disclosure relate to electronic technologies, and in particular, to a CPU interconnect device.

BACKGROUND

A full direct-connection manner of PCB boards proposed by the IBM company implements the interconnection between CPUs. Each IBM Power CPU has seven high-speed interconnect interfaces, and may be interconnected to seven Power CPUs at the same time. Eight Power CPUs may form an 8P system in the full direct-connection manner. However, since the Power CPU is integrated with functions of an NC controller, the cost is relatively high. Limited by the number of the Power CPU interconnect interfaces, a CPU system formed by the Power CPUs has poor scalability and low flexibility.

The HP company adopts an NC node controller and a switch module to implement the interconnection between CPUs, and the whole system of the interconnect architecture is complex. In the solution, two chips are added in the whole system, which implement the function of the NC node controller and the function of the switch module, respectively. Since the switch module is used for data exchange among NCs in the solution, each switch module needs to perform jump-point judgment, which increases data transmission delay, resulting in low system performance and a high cost.

Therefore, the existing interconnect system among CPUs has poor scalability, long data transmission delay, and a high cost.

SUMMARY

Embodiments of the disclosure provide a CPU interconnect device, to solve defects of poor scalability, long data transmission delay, and a high cost of an existing interconnect system among CPUs.

An embodiment of the present disclosure provides a CPU interconnect device, the CPU interconnect device connects with a first CPU, including:

a quick path interconnect QPI interface, configured to receive a first serial QPI data sent from the first CPU, convert the received first serial QPI data into a first parallel QPI data, and output the first parallel QPI data to a serial deserial SerDes interface; and the serial deserial SerDes interface, configured to convert the first parallel QPI data output by the QPI interface into a first high-speed serial SerDes data and then send the first high-speed serial SerDes data to another CPU interconnect device connected with a second CPU;

wherein the SerDes interface is further configured to receive a second high-speed serial SerDes data sent from the another CPU interconnect device, convert the received second high-speed serial SerDes data into a second parallel QPI data, and output the second parallel QPI data to the QPI interface; and the QPI interface is further configured to convert the second parallel QPI data output by the SerDes interface into a second serial QPI data and then send the second serial QPI data to the CPU.

In the CPU interconnect device according to the embodiments of the present disclosure, the QPI interface module is connected to one CPU, the SerDes interface module is connected to a SerDes interface module on another CPU interconnect device, and a QPI interface module on another CPU interconnect device is connected to another CPU. Therefore, two dedicated CPU interconnect devices provided by the embodiments of the present disclosure are capable of implementing the interconnection between two CPUs. Eight dedicated CPU interconnect devices may form a 4P system in which four CPUs are interconnected, and 16 dedicated CPU interconnect devices may form a 8P system in which eight CPUs are interconnected. Through the system formed by the dedicated CPU interconnect devices provided by the embodiments of the present disclosure, when the number of internally interconnected CPUs increases or decreases, the number of the dedicated CPU interconnect devices may be increased or decreased. Therefore, the system has high scalability and flexibility. Since two CPUs in the system are connected to each other through two dedicated CPU interconnect devices, the process of selecting a receiving CPU does not exist during data transmission between CPU interconnect devices, and two adjacent CPU interconnect devices are connected to each other through a SerDes interface module supporting long-distance high-speed transmission, thereby reducing data transmission delay between CPUs.

BRIEF DESCRIPTION OF THE DRAWINGS

To illustrate the technical solutions according to the embodiments of the present disclosure or in the prior art more clearly, the accompanying drawings for describing the embodiments are introduced briefly in the following. Apparently, the accompanying drawings in the following description are only about some embodiments of the present disclosure, and persons of ordinary skill in the art can derive other drawings from the accompanying drawings without creative efforts.

DETAILED DESCRIPTION OF THE EMBODIMENTS

In order to make the objectives, technical solutions, and advantages of the present disclosure more clearly, the technical solutions in the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

Figure 1A:
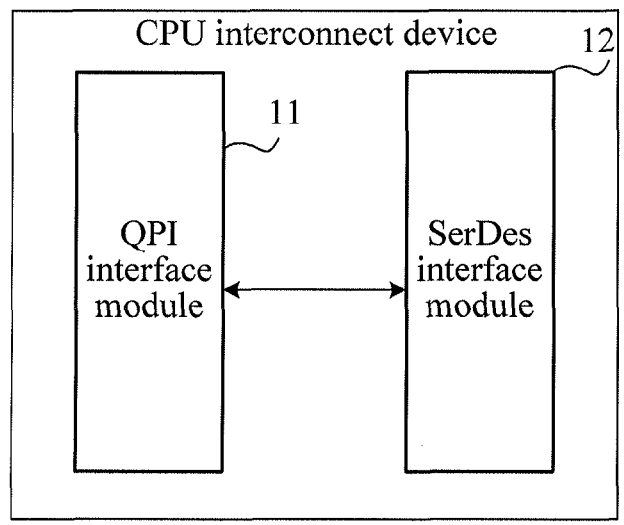
FIG. 1A is a schematic structural diagram of a CPU interconnect device according to an embodiment of the present disclosure.

FIG. 1A is a schematic structural diagram of a CPU interconnect device according to an embodiment of the present disclosure. The CPU interconnect device in the embodiment of the present disclosure may be implemented through the field programmable gate array (Field Programmable Gate Array, FPGA). As shown in FIG. 1A, this embodiment includes a QPI (Quick Path Interconnect, quick path interconnect) interface module 11 and a SerDes interface module 12.

The QPI interface module 11 is connected to a QPI interface of a CPU. The SerDes interface module 12 is connected to the QPI interface module 11 and another SerDes interface module, where the another SerDes interface module is located on another CPU interconnect device used for interconnection among CPUs.

The QPI interface module 11 is configured to convert serial QPI data sent from the CPU into parallel QPI data. The QPI interface module converts the serial QPI data sent from the CPU into the parallel QPI data, so that the frequency of the QPI data is reduced, so as to adapt to a data processing frequency inside the CPU interconnect device.

The SerDes interface module 12 is configured to convert the parallel QPI data received from the QPI interface module into high-speed serial SerDes data, and send the high-speed serial SerDes data to the another SerDes interface module. Since the SerDes interface module converts a QPI data interface with the DC characteristic that does not support long-distance cable interconnection and topology into a SerDes interface with an AC characteristic, long-distance high-speed cable interconnection and topology are supported, thereby implementing high-speed interconnection among inter-board processors.

The SerDes interface module 12 is further configured to receive high-speed serial SerDes data sent from the another SerDes interface module, and convert the received high-speed serial SerDes data into parallel QPI data. The QPI interface module 11 is further configured to convert the parallel QPI data sent from the SerDes interface module into serial QPI data and then send the serial QPI data to the connected CPU.

Furthermore, the bandwidth of a channel between the QPI interface module 11 and the SerDes interface module 12 is greater than the bandwidth of a QPI channel, thereby avoiding QPI packet loss due to overflow of the channel for transparent transmission.

Figure 1B:
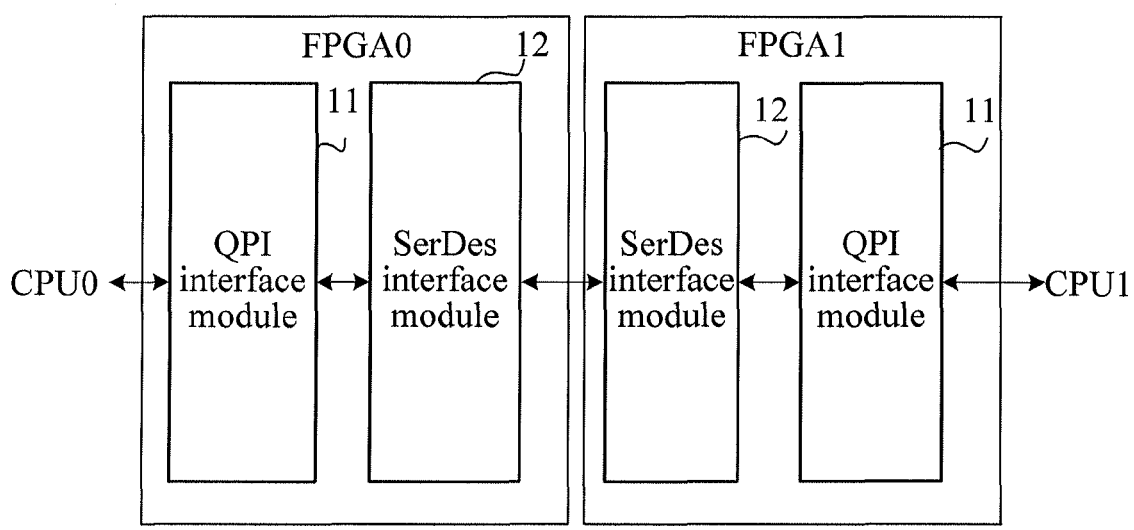
FIG. 1B is a schematic diagram illustrating the interconnection among inter-board CPUs implemented through the CPU interconnect device shown in FIG. 1A.

FIG. 1B is a schematic diagram illustrating the interconnection among inter-board CPUs through the CPU interconnect device shown in FIG. 1A. As shown in FIG. 1B, when the CPU interconnect device in FIG. 1A is implemented by using the FPGA, the interconnection among CPU0 and CPU1 is implemented through two CPU interconnect devices (FPGA0 and FPGA1) implemented by using the FPGA. The QPI interface module 11 on FPGA0 is connected to a QPI interface of CPU0, and the SerDes interface module 12 on FPGA0 is connected to a SerDes interface module on FPGA 1. A QPI interface module on FPGA1 is connected to a QPI interface of another CPU1. A manner of transmitting data from CPU0 to CPU1 by FPGA0 and FPGA1 is described in the following. Data from CPU1 is transmitted to CPU0 in a similar manner.

CPU0 sends 4.8 Gbp/s high-speed serial QPI data to the QPI interface module 11 through 20 QPI channels at the same time, and after receiving the high-speed serial QPI data, the QPI interface module 11 converts the 20-bit serial QPI data into 640-bit parallel QPI data, and sends the 640-bit parallel QPI data to the SerDes interface module 12. After the SerDes interface module 12 receives the 640-bit parallel QPI data, the SerDes interface module 12 first performs CDR encoding on the 640-bit parallel QPI data, and then converts it into high-speed serial SerDes data, and afterwards, sends the high-speed serial SerDes data to the SerDes interface module on FPGA1 through a high-speed cable (CXP). After receiving the high-speed serial SerDes data sent from the SerDes interface module on FPGA0, the SerDes interface module on FPGA1 re-converts the high-speed serial SerDes data into 640-bit parallel QPI data, and then sends the 640-bit parallel QPI data to the QPI interface module on FPGA1. The QPI interface module on FPGA1 converts the 640-bit parallel QPI data into 20-bit serial QPI data, and then sends the 20-bit serial QPI data to the connected CPU1 through the QPI channel.

SerDes is short for serializer and de-serializer. At a sending end, the SerDes interface module on FPGA0 converts multi-path low-speed 640-bit parallel QPI data into high-speed serial data signals, and then transmits the high-speed serial data signal to the SerDes interface module on FPGA1 through the high-speed cable. At a receiving end, the SerDes interface module on FPGA1 re-converts the high-speed serial data signal into low-speed 640-bit parallel QPI data. The SerDes interface module fully utilizes the channel capacity of transmission media, thereby reducing required transmission channels and device pin data, and decreasing a transmission cost. The SerDes interface module may adopt a bi-directional 6 Gbps 20 lane bound channel with effective bandwidth being 120 GB/s, where additionally added 1 lane is used for transmitting an out-of-band control signal between FPGAs.

In the CPU interconnect device according to the embodiment of the present disclosure, the QPI interface module is connected to one CPU, the SerDes interface module is connected to a SerDes interface module on the another CPU interconnect device, and a QPI interface module on another CPU interconnect device is connected to another CPU. Therefore, two dedicated CPU interconnect devices provided by the embodiment of the present disclosure are capable of implementing the interconnection between two CPUs. Eight dedicated CPU interconnect devices may form a 4P system in which four CPUs are interconnected, and 16 dedicated CPU interconnect devices may form a 8P system in which eight CPUs are interconnected. Through the system formed by the dedicated CPU interconnect devices provided by the embodiment of the present disclosure, when the number of internally interconnected CPUs increases or decreases, the number of the dedicated CPU interconnect devices may be increased or decreased. Therefore, the system has high scalability and flexibility. Since two CPUs in the system are connected to each other through two dedicated CPU interconnect devices, the process of selecting a receiving CPU does not exist during data transmission between CPU interconnect devices, and two adjacent CPU interconnect devices are connected to each other through a SerDes interface module supporting long-distance high-speed transmission, thereby reducing data transmission delay between CPUs.

Figure 2A:
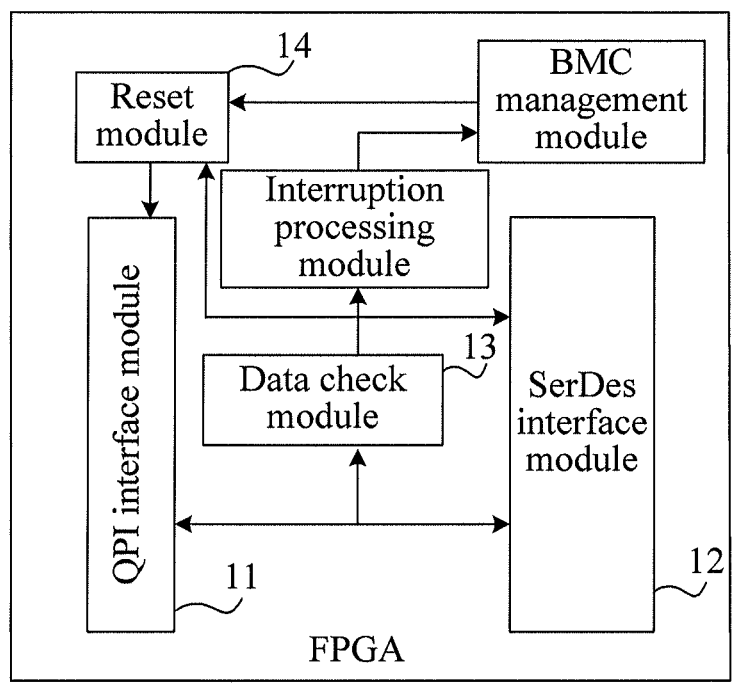
FIG. 2A is a schematic structural diagram of a CPU interconnect device implemented through an FPGA according to an embodiment of the present disclosure.

FIG. 2A is a schematic structural diagram of a CPU interconnect device implemented through the FPGA according to an embodiment of the present disclosure. As shown in FIG. 2A, the CPU interconnect device on the basis of FIG. 1A further includes: a data check module 13 and a reset module 14, where the data check module 13 is connected to the QPI interface module 11 and the SerDes interface module 12, and the reset module 14 is connected to the data check module 13 and the SerDes interface module 12.

The data check module 13 is configured to perform data check on the parallel QPI data output by the QPI interface module 11, and report a check result to a BMC management module in the case of a data error. The data check module 13 is further configured to perform data check on the parallel QPI data output by the SerDes interface module 12, and report a check result to the BMC management module in the case of a data error. Specifically, the data check module 13 is further connected to an interruption processing module, and reports the check result to the BMC management module through the interruption processing module. The BMC management module may be system software in the CPU interconnect device implemented through the FPGA.

If the data check module 13 determines, through the check, that an error occurs in the parallel QPI data output by the QPI interface module 11, the data check module 13 reports the check result to the BMC management module. If the data check module 13 determines, through the check, that an error occurs in the parallel QPI data output by the SerDes interface module 12, the data check module 13 reports the check result to the BMC management module. Specifically, the data check module 13 reports the check result to the BMC management module through the interruption processing module.

The reset module 14 is configured to receive a reset instruction from the BMC management module that is given according to the check result reported by the data check module 13, and then reset the QPI interface module or the SerDes interface module according to the reset instruction, and further send the reset instruction to the SerDes interface module.

The reset module 14 is further configured to receive, through the SerDes interface module, a reset instruction sent from another SerDes interface module, and then reset the QPI interface module or the SerDes interface module according to the reset instruction.

When the BMC management module determines that an error rate of the parallel QPI data output by the QPI interface module 11 is high according to the check result reported by the data check module 13, the BMC management module sends, to the reset module 14, a reset instruction used for resetting the QPI interface module 11. The reset module 14 resets the local QPI interface module 11 according to the reset instruction, and meanwhile sends the reset instruction to a reset module on a peer FPGA through the SerDes interface module 12, so that the reset module on the peer FPGA resets the QPI interface module 11 on the peer FPGA.

When the BMC management module determines that an error rate of the parallel QPI data output by the SerDes interface module 12 is high according to the check result reported by the data check module 13, the BMC management module sends, to the reset module 14, a reset instruction used for resetting the SerDes interface module 12. The reset module 14 resets the SerDes interface module 12 according to the reset instruction, and meanwhile sends the reset instruction to a reset module on a peer FPGA through the SerDes interface module 12, so that the reset module on the peer FPGA also resets the SerDes interface module 12 on the peer FPGA.

Figure 2B:
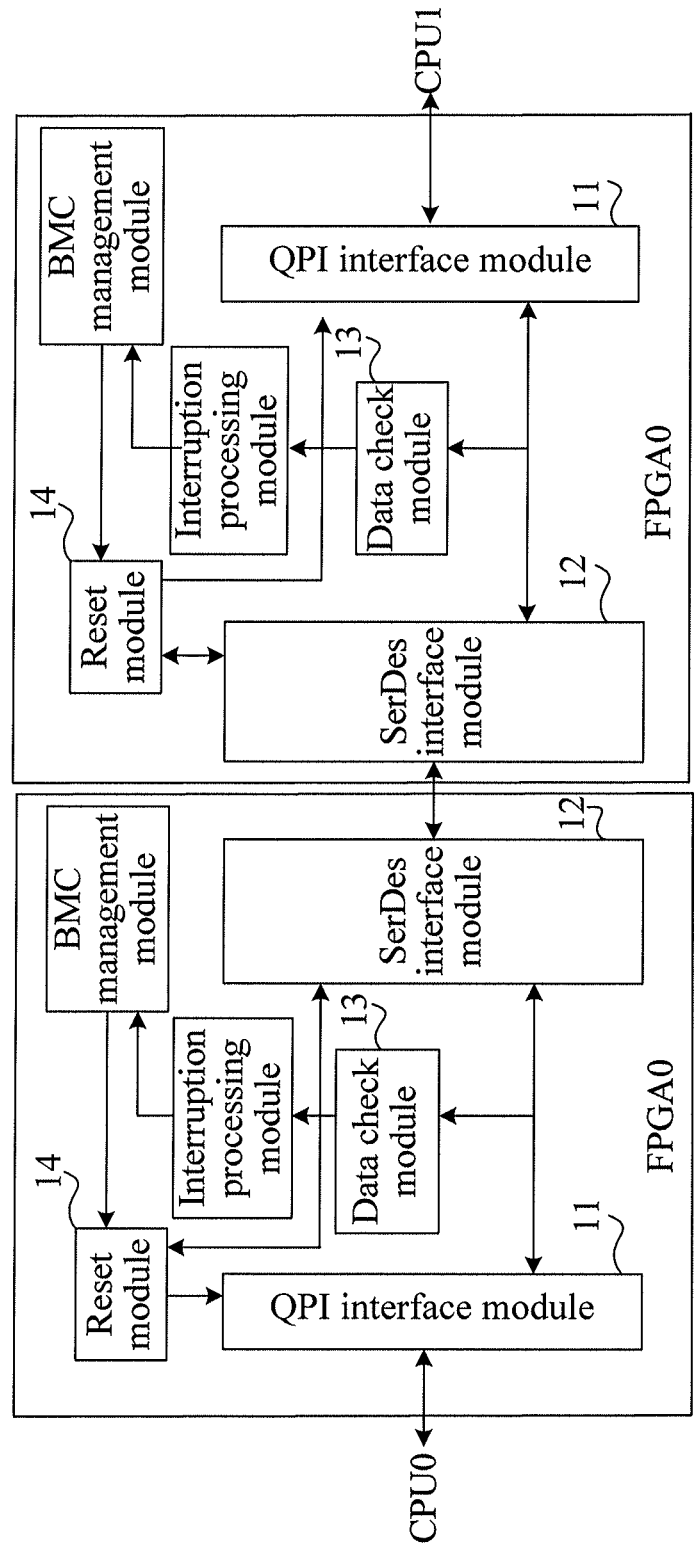
FIG. 2B is a schematic diagram illustrating the interconnection among inter-board CPUs implemented through the FPGA shown in FIG. 2A.

FIG. 2B is a schematic diagram illustrating the interconnection among inter-board CPUs implemented through the FPGA shown in FIG. 2A. As shown in FIG. 2B, the data check module 13 on FPGA0 or FPGA1 is connected to the QPI interface module 11 and the SerDes interface module 12, and the reset module 14 on FPGA0 or FPGA1 is connected to the data check module 13 and the SerDes interface module 12.

After converting the serial QPI data of CPU0 into parallel QPI data, the QPI interface module 11 on FPGA0 outputs the parallel QPI data to the data check module 13 and the SerDes interface module 12 at the same time. If the data check module 13 determines, through the check, that an error occurs in the parallel QPI data output by the QPI interface module 11, the data check module 13 reports the check result to the BMC management module through the interruption processing module. The SerDes interface module 12 receives the parallel QPI data, converts the parallel QPI data into high-speed serial SerDes data, and then sends the high-speed serial SerDes data to the SerDes interface module on FPGA1.

After receiving the high-speed serial SerDes data sent from the SerDes interface module on FPGA0, the SerDes interface module on FPGA1 re-converts the high-speed serial SerDes data into 640-bit parallel QPI data, and then sends the 640-bit parallel QPI data to the QPI interface module and the data check module 13 on FPGA1 at the same time. If the data check module 13 determines, through the check, that an error occurs in the parallel QPI data output by the SerDes interface module, the data check module 13 reports the check result to the BMC management module through the interruption processing module. The QPI interface module on FPGA1 converts the parallel QPI data into serial QPI data, and then sends the serial QPI data to the connected CPU1.

When the BMC management module on FPGA0 determines that an error rate of the parallel QPI data output by the QPI interface module 11 is high according to the check result reported by the data check module 13, the BMC management module sends, to the reset module 14, a reset instruction used for resetting the QPI interface module 11. The reset module 14 resets the QPI interface module 11 on FPGA0 according to the reset instruction, and meanwhile sends the reset instruction to a reset module on FPGA1 through the SerDes interface module 12, so that the reset module on FPGA1 also resets the QPI interface module 11 on FPGA1. After the reset module on FPGA1 receives the reset instruction from FPGA1, the reset module resets the QPI interface module 11 on FPGA1 according to the reset instruction.

When the BMC management module on FPGA0 determines that an error rate of the parallel QPI data output by the SerDes interface module is high according to the check result reported by the data check module 13, the BMC management module sends, to the reset module 14, a reset instruction used for resetting the SerDes interface module. The reset module 14 resets the SerDes interface module on FPGA0 according to the reset instruction, and meanwhile sends the reset instruction to a reset module on FPGA1 through the SerDes interface module 12, so that the reset module on FPGA1 also resets the SerDes interface module 12 on FPGA1. After the reset module on FPGA1 receives the reset instruction from FPGA1, the reset module resets the SerDes interface module 12 on FPGA1 according to the reset instruction.

In this embodiment, accuracy of the QPI data output by the QPI interface module and accuracy of the QPI data output by the SerDes interface module are improved through the data check module and the reset module, thereby reducing an error rate during communication between two CPUs.

Figure 3A:
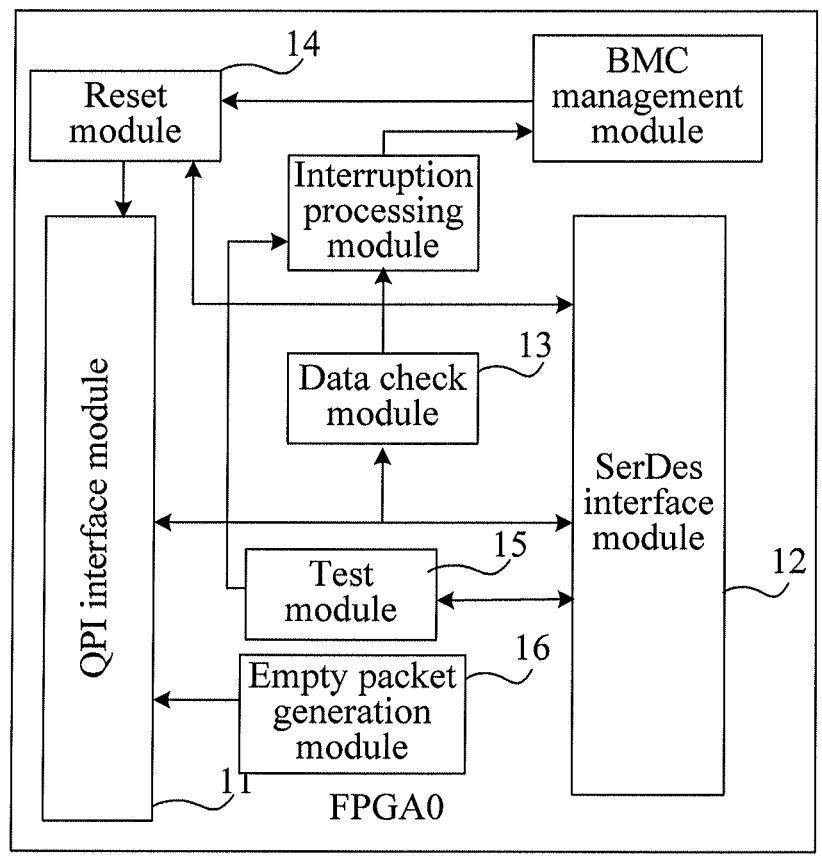
FIG. 3A is a schematic structural diagram of another CPU interconnect device implemented through an FPGA according to an embodiment of the present disclosure.

FIG. 3A is a schematic structural diagram of another CPU interconnect device implemented through the FPGA according to an embodiment of the present disclosure. As shown in FIG. 3A, the CPU interconnect device on the basis of FIG. 2A further includes: a test module 15, where the test module 15 is connected to the SerDes interface module 12.

The test module 15 is configured to generate a test sequence when the FPGA is in test mode, and send the generated test sequence to a test module on another FPGA through the SerDes interface module and another SerDes interface module.

The test module 15 is further configured to receive, through the SerDes interface module and the another SerDes interface module, a test sequence generated by the test module on the another FPGA, and perform data check on the received test sequence.

Furthermore, the test module 15 reports a test result to the BMC management module. The test module 15 may report the test result to the BMC management module through the interruption processing module.

The FPGA provided by this embodiment has the following two operating modes: a test mode and a normal operating mode. In normal operating mode, the FPGA transmits data from two CPUs. When the FPGA is in test mode, the QPI interface module on another FPGA connected to the FPGA is not connected to another CPU, that is, a QPI link is not established. Therefore, the FPGA does not transmit the data from the two CPUs, and the test module 15 generates the test sequence, and transmits the test sequence on a SerDes link between the two FPGAs, so as to test the accuracy of the SerDes link between the two FPGAs.

As shown in FIG. 3A, the CPU interconnect device further includes: an empty packet generation module 16. The empty packet generation module 16 is connected to the QPI interface module 11. When two FPGAs are interconnected, the QPI interface module on one of the two FPGAs is not connected to a CPU, that is, a QPI link is not established, since the SerDes interface module on the other FPGA does not receive high-speed serial SerDes data, parallel QPI data cannot be sent to the QPI interface module. At this time, the empty packet generation module 16 generates an empty packet and sends the generated empty packet to the QPI interface module.

Figure 3B:
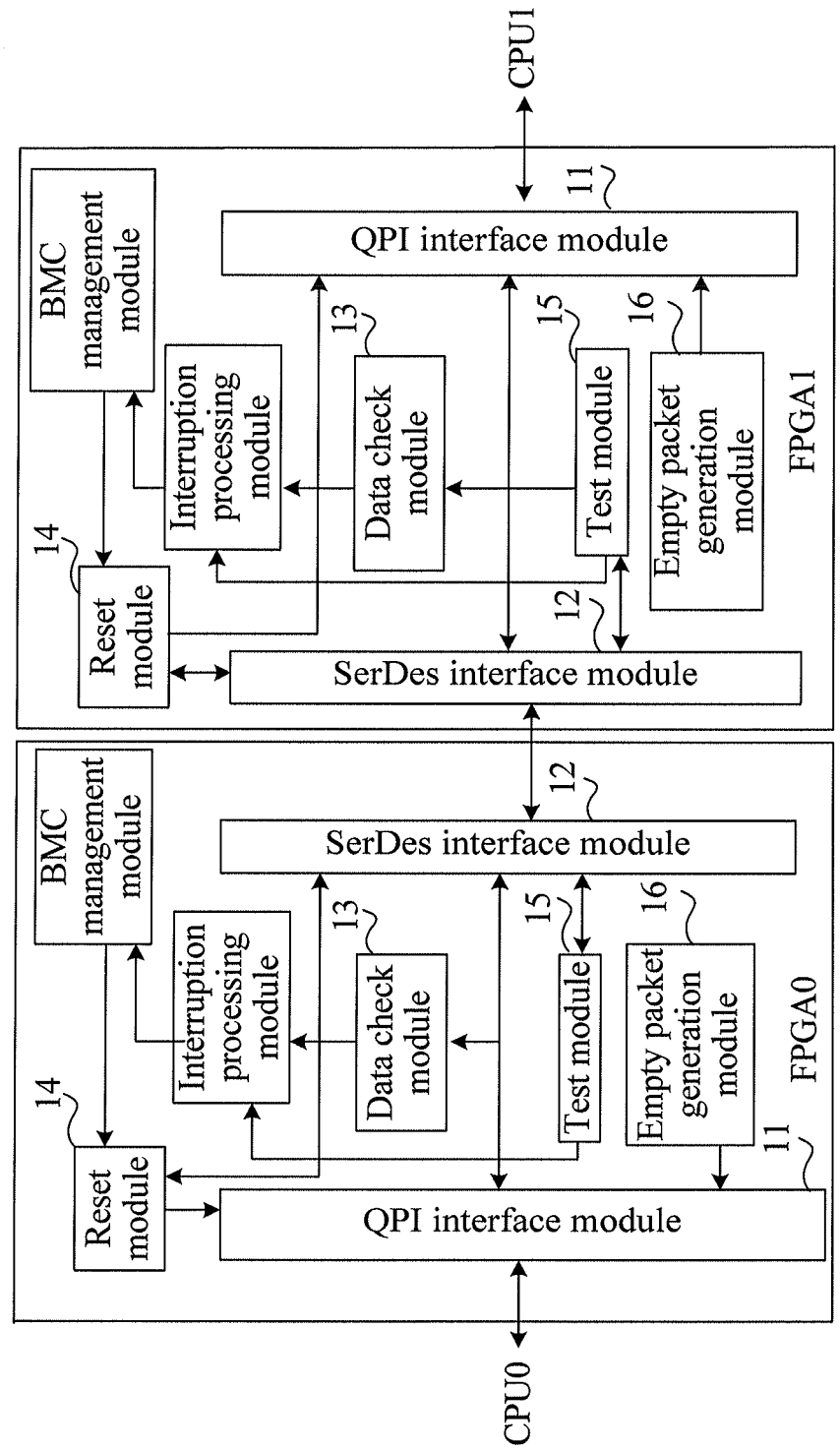
FIG. 3B is a schematic diagram illustrating the interconnection among inter-board CPUs implemented through the FPGA shown in FIG. 3A.

FIG. 3B is a schematic diagram illustrating the interconnection among inter-board CPUs implemented through the FPGA shown in FIG. 3A. As shown in FIG. 3B, the test module 15 on FPGA0/FPGA1 is connected to the SerDes interface module 12. A manner of testing the accuracy of the SerDes link by the test module 15 on FPGA0 or FPGA1 is described in the following.

When FPGA0 and FPGA1 are in test mode, the test module 15 on FPGA0 generates a test sequence and sends the generated test sequence to the SerDes interface module on FPGA1 through the SerDes interface module on FPGA0. The SerDes interface module on FPGA1 sends the received test sequence to the test module on FPGA1, and the test module on FPGA1 checks the test sequence. When determining that an error occurs in the received test sequence, the test module on FPGA1 reports a test result to the BMC management module. Likewise, the test module on FPGA1 may send a test sequence, and the test module on FPGA0 checks the test sequence.

The QPI interface module on FPGA1 is not connected to CPU1, while the QPI interface module on FPGA0 is connected to CPU0. The empty packet generation module 16 on FPGA0 sends the generated empty packet to the QPI interface module on FPGA0.

In the CPU interconnect device implemented through the FPGA according to this embodiment, in test mode, the test module generates the test sequence, and transmits the test sequence on the SerDes link between two FPGAs, so as to test the accuracy of the SerDes link between the two FPGAs.

Figure 4A:
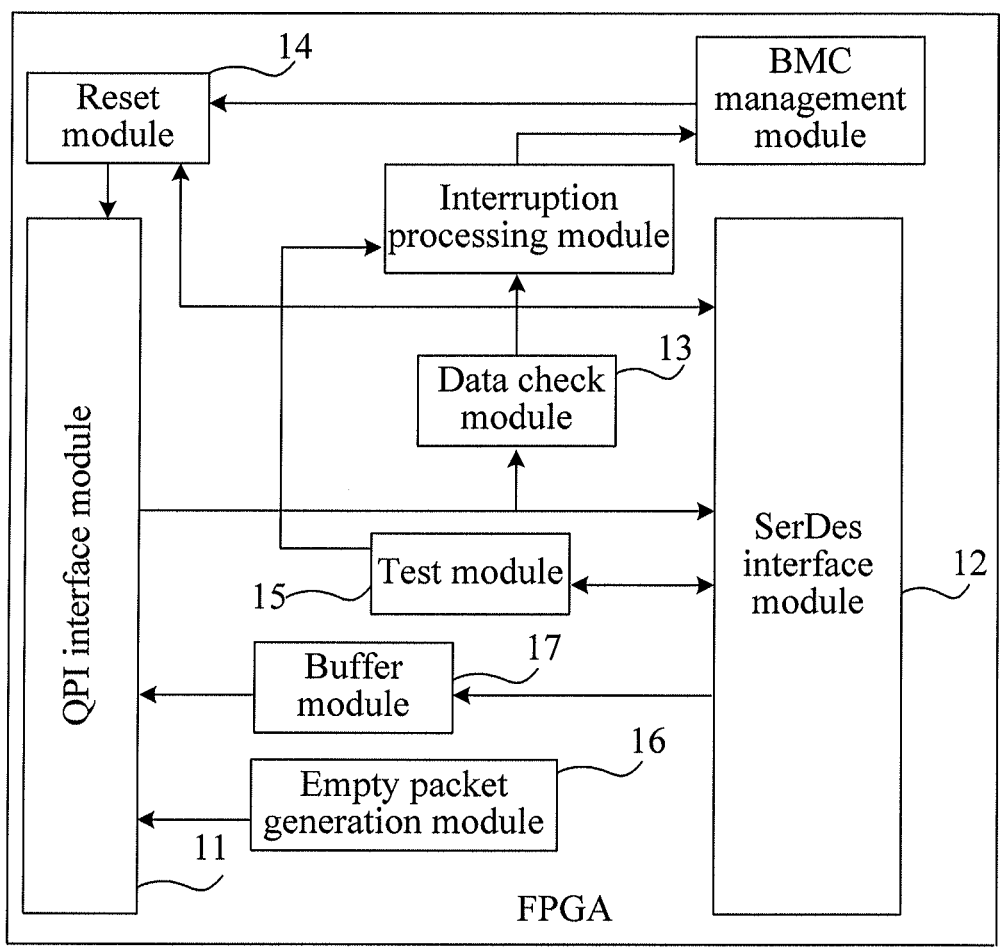
FIG. 4A is a schematic structural diagram of still another CPU interconnect device implemented through an FPGA according to an embodiment of the present disclosure.

FIG. 4A is a schematic diagram of still another CPU interconnect device implemented through the FPGA according to an embodiment of the present disclosure. As shown in FIG. 4A, the CPU interconnect device on the basis of FIG. 3A further includes a buffer module 17. The buffer module 17 is connected to the SerDes interface module and the QPI interface module.

A clock of the FPGA may drift. When the clock of the FPGA drifts, an edge of forwarded clock of the FPGA is not centered on each sent serial QPI data lane, thereby causing an error when the QPI interface of the CPU samples QPI serial data. In order that the edge of forwarded clock of the FPGA is centered on each sent serial QPI data lane, and in order to ensure the accuracy of the data sampled by the QPI interface of the CPU, the QPI interface module 11 is further configured to periodically perform data training, so that the edge of forwarded clock of the FPGA is centered on each sent serial QPI data lane.

The buffer module 17 is configured to buffer the parallel QPI data output by the SerDes interface module, and send the buffered parallel QPI data to the QPI interface module and the data check module after the training performed by the QPI interface module is completed. The parallel QPI data output by the SerDes interface module is first buffered by the buffer module 17, and then the parallel QPI data is sent to the QPI interface module and the data check module after the training performed by the QPI interface module is completed. The QPI interface module converts the buffered parallel QPI data into serial QPI data and then sends the serial QPI data to the CPU. The data check module performs data check on the buffered parallel QPI data.

Figure 4B:
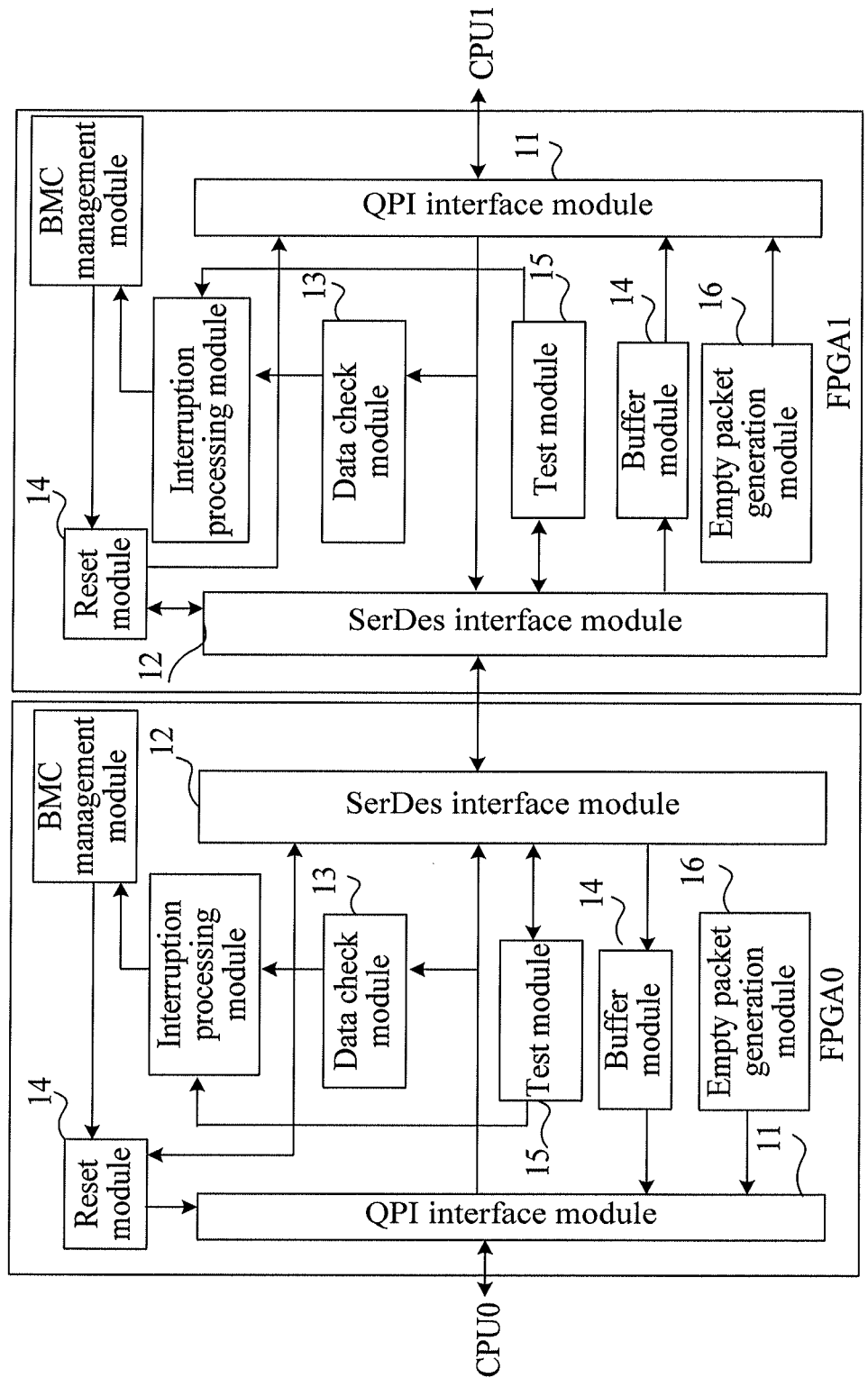
FIG. 4B is a schematic diagram illustrating the interconnection among inter-board CPUs implemented through the FPGA shown in FIG. 4A.

FIG. 4B is a schematic diagram illustrating the interconnection among inter-board CPUs implemented through the FPGA shown in FIG. 4A. As shown in FIG. 4B, FPGA0/FPGA1 further includes a buffer module 17 connected to the SerDes interface module and the QPI interface module.

After the SerDes interface module on FPGA0 sends high-speed SerDes data to the SerDes interface module on FPGA1, the SerDes interface module on FPGA1 converts the high-speed SerDes data into parallel QPI data and outputs the parallel QPI data to the buffer module 17. The buffer module buffers the parallel QPI data, and sends the buffered parallel QPI data to the QPI interface module and the data check module after the training performed by the QPI interface module is completed. Likewise, the buffer module 17 on FPGA0 also buffers the parallel QPI data output by the SerDes interface module on FPGA0, and then sends the buffered parallel QPI data to the QPI interface module and the data check module on FPGA0 after the training performed by the QPI interface module on FPGA0 is completed.

In the CPU interconnect device implemented through the FPGA according to this embodiment, the QPI interface module periodically performs data training, so that the edge of forwarded clock of the FPGA is centered on each sent serial QPI data lane, so as to ensure the accuracy of the data sampled by the QPI interface of the CPU. Since the QPI interface module needs to periodically perform data training, the parallel QPI data output by the SerDes interface module is buffered in the buffer module, and after the data training performed by the QPI data interface module is completed, the parallel QPI data output by the SerDes interface module is sent to the QPI interface module.

Figure 5A:
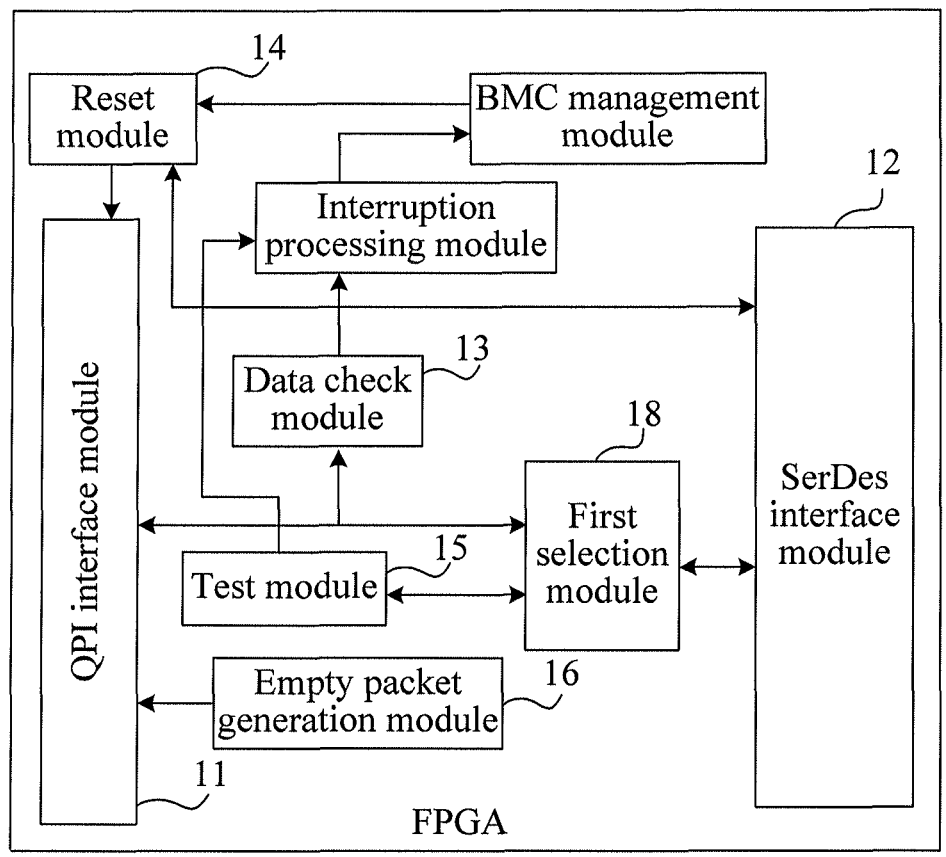
FIG. 5A is a schematic structural diagram of yet another CPU interconnect device implemented through an FPGA according to an embodiment of the present disclosure.

FIG. 5A is a schematic structural diagram of yet another CPU interconnect device implemented through the FPGA according to an embodiment of the present disclosure. As shown in FIG. 5A, the CPU interconnect device on the basis of FIG. 3A further includes a first selection module 18. The first selection module 18 is connected to the test module 15, the QPI interface module 11, the SerDes interface module 12 and the data check module 13.

The first selection module 18 is configured to send the test sequence output by the test module 15 to the SerDes interface module 12 when the FPGA is in test mode, and send the parallel QPI data output by the QPI interface module 11 to the SerDes interface module 12 when the FPGA is in normal mode.

The first selection module 18 is further configured to send a test sequence that is from another test module and is output by the SerDes interface module to the test module 15 when the FPGA is in test mode, and send the parallel QPI data output by the SerDes interface module 12 to the QPI interface module 11 and the data check module 13 when the FPGA is in normal mode.

The data check module 13 is specifically configured to perform data check on the parallel QPI data output by the first selection module 18, and report a check result to the BMC management module in the case of a data error; and perform data check on the parallel QPI data output by the QPI interface module 11, and report a check result to the BMC management module in the case of a data error.

Figure 5B:
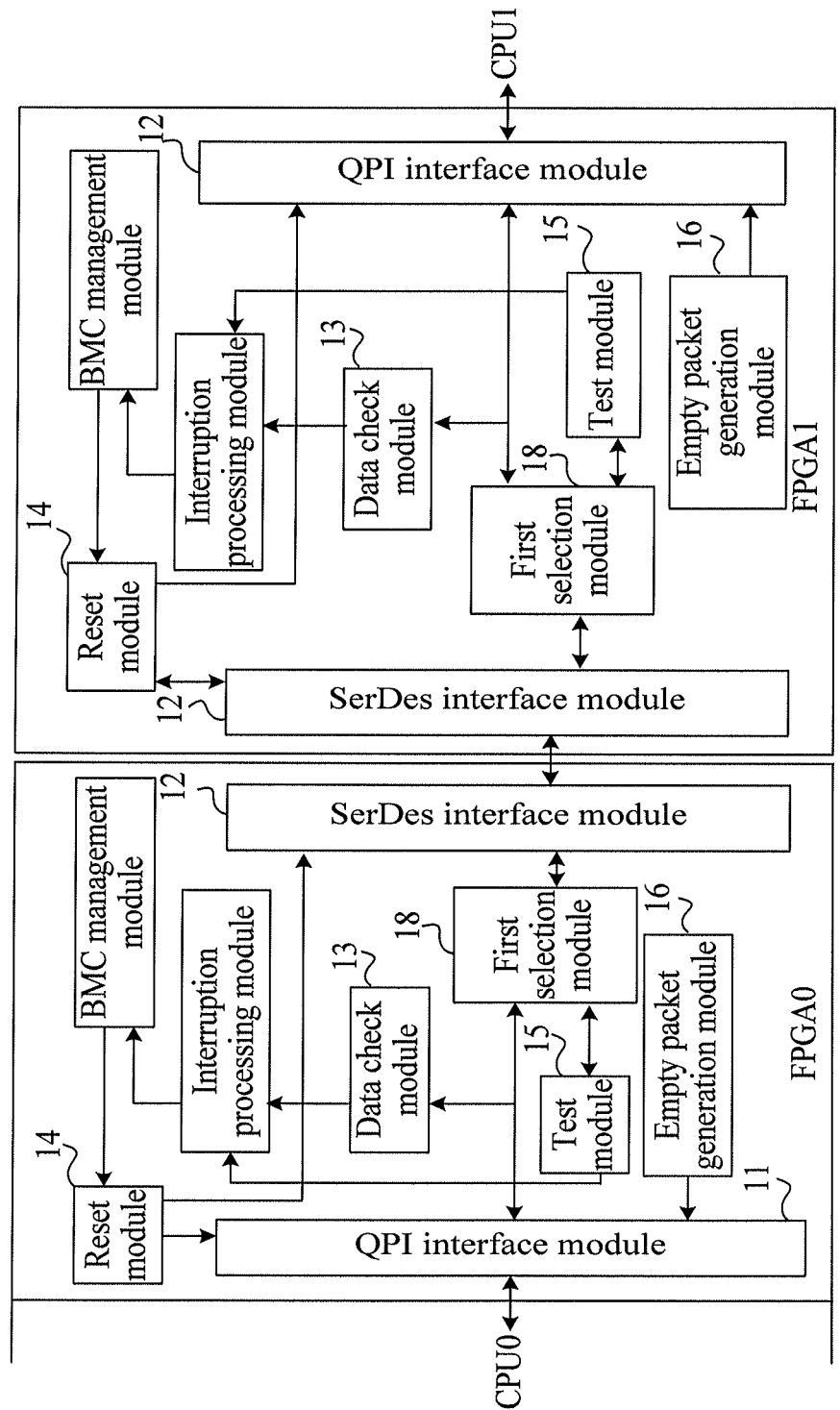
FIG. 5B is a schematic diagram illustrating the interconnection among inter-board CPUs implemented through the FPGA shown in FIG. 5A.

FIG. 5B is a schematic diagram illustrating the interconnection among inter-board CPUs implemented through the FPGA shown in FIG. 5A. As shown in FIG. 5B, FPGA0/FPGA1 further includes a first selection module 18.

The test module 15 on FPGA0 generates a test sequence and outputs the test sequence to the first selection module 18. When determining that the FPGA0 is in test mode currently, the first selection module 18 sends the received test sequence to the SerDes interface module 12 on FPGA0. The test sequence is transmitted to the SerDes interface module 12 on FPGA1 through the SerDes interface module 12 on FPGA0, and then is transmitted to the first selection module 18 on FPGA1. When determining that the FPGA1 is in test mode currently, the first selection module 18 on FPGA1 sends the received test sequence to the test module 15 on FPGA1, and the test module 15 checks the test sequence.

The QPI interface module 11 on FPGA0 sends the output parallel QPI data to the first selection module 18 and the data check module 13, and the data check module 13 performs data check on the parallel QPI data output by the QPI interface module, and reports a check result to the BMC management module in the case of a data error. When determining that the FPGA0 is in normal operating mode currently, the first selection module 18 sends the received parallel QPI data to the SerDes interface module 12, and the parallel QPI data is then transmitted to the first selection module 18 on FPGA1. When determining that the FPGA1 is in normal operating mode currently, the first selection module 18 on FPGA1 sends the received parallel QPI data to the QPI interface module 11 and the data check module 13.

In this embodiment, according to the operating mode of the FPGA, the first selection module 18 determines whether to send the data output by the SerDes interface module 12 to the test module or send the data to the QPI interface module 11, and determines whether to send the test sequence to the SerDes interface module 12 or send the QPI parallel data to the SerDes interface module 12.

Figure 6A:
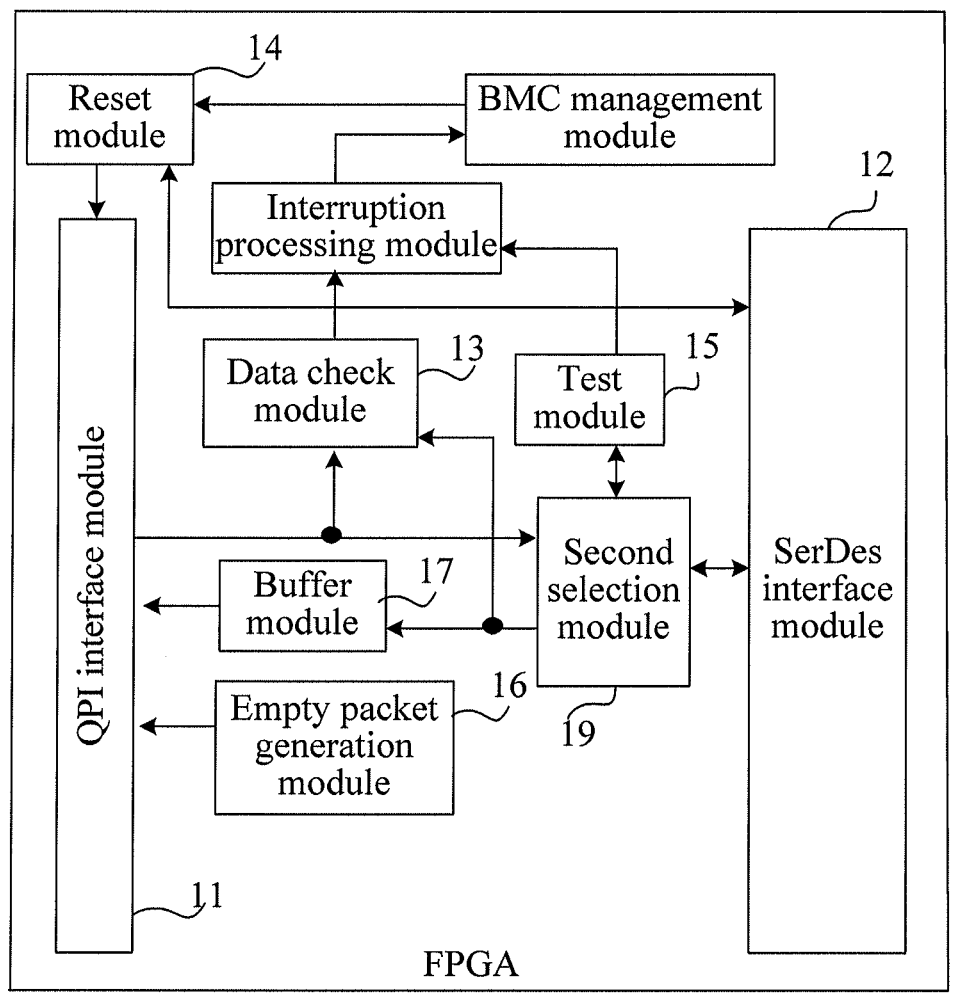
FIG. 6A is a schematic structural diagram of yet another CPU interconnect device implemented through an FPGA according to an embodiment of the present disclosure.

FIG. 6A is a schematic structural diagram of yet another CPU interconnect device implemented through the FPGA according to an embodiment of the present disclosure. As shown in FIG. 6A, the CPU interconnect device on the basis of FIG. 3A further includes a buffer module 17 and a second selection module 19. The second selection module 19 is connected to the test module 15, the QPI interface module 11, the SerDes interface module 12, the data check module 13 and the buffer module 17. The buffer module 17 is further connected to the QPI interface module 11.

The second selection module 19 is configured to send the test sequence output by the test module 15 to the SerDes interface module 12 when the FPGA is in test mode, and send the parallel QPI data output by the QPI interface module 11 to the SerDes interface module 12 when the FPGA is in normal mode.

The second selection module 19 is further configured to send a test sequence that is from another test module and is output by the SerDes interface module to the test module when the FPGA is in test mode, and send the parallel QPI data output by the SerDes interface module to the buffer module 17 and the data check module when the FPGA is in normal mode.

The buffer module 17 is configured to buffer the parallel QPI data output by the second selection module 19, and send the parallel QPI data output by the second selection module 19 to the QPI interface module 11 after the training performed by the QPI interface module 11 is completed.

The data check module 13 is specifically configured to perform data check on the parallel QPI data output by the QPI interface module 11, and report a check result to the BMC management module in the case of a data error; and perform data check on the parallel QPI data output by the second selection module 19, and report a check result to the BMC management module in the case of a data error.

Figure 6B:
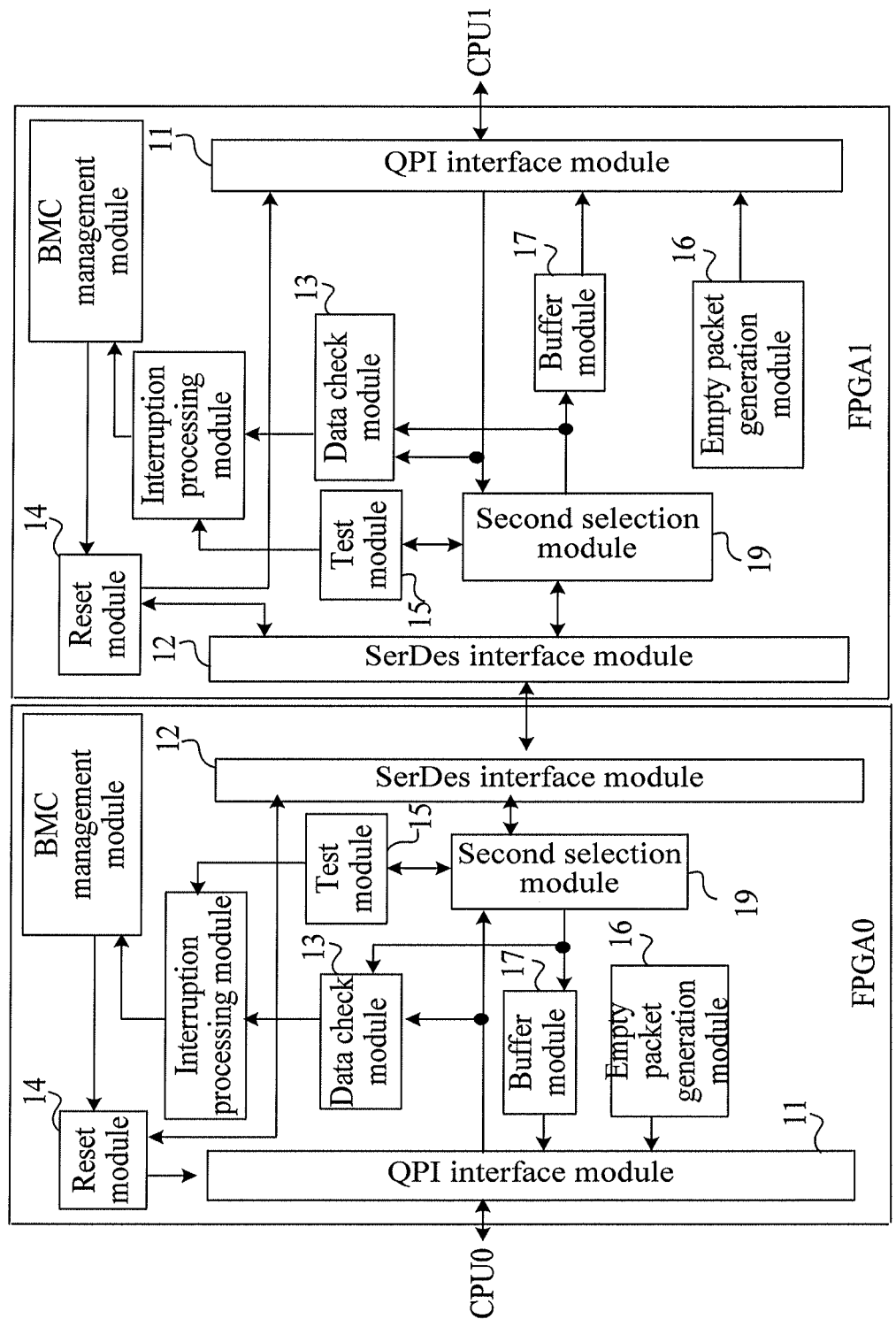
FIG. 6B is a schematic diagram illustrating the interconnection among inter-board CPUs implemented through the FPGA shown in FIG. 6A.

FIG. 6B is a schematic diagram illustrating the interconnection among inter-board CPUs implemented through the FPGA shown in FIG. 6A. As shown in FIG. 6B, on the basis of FIG. 3B, FPGA0/FPGA1 further includes a buffer module 17 and a second selection module 19.

The test module 15 on FPGA0 generates a test sequence and outputs the test sequence to the second selection module 19. When determining that the FPGA0 is in test mode currently, the second selection module 19 sends the received test sequence to the SerDes interface module 12 on FPGA0. The test sequence is transmitted to the SerDes interface module 12 on FPGA1 through the SerDes interface module 12 on FPGA0, and then is transmitted to the first selection module 18 on FPGA1. When determining that the FPGA1 is in test mode currently, the second selection module 19 on FPGA1 sends the received test sequence to the test module 15 on FPGA1, and the test module 15 checks the test sequence.

The QPI interface module 11 on FPGA0 sends the output parallel QPI data to the second selection module 19 and the data check module 13, and the data check module 13 is configured to perform data check on the parallel QPI data output by the QPI interface module and report a check result to the BMC management module in the case of a data error. When determining that the FPGA0 is in normal operating mode currently, the second selection module 19 sends the received parallel QPI data to the SerDes interface module 12, and the parallel QPI data is then transmitted to the second selection module 19 on FPGA1. When determining that the FPGA1 is in normal operating mode, the second selection module 19 on FPGA1 sends the received parallel QPI data to the buffer module 17 and the data check module 13. The buffer module 17 buffers the parallel QPI data output by the second selection module 19, and sends the parallel QPI data output by the second selection module 19 to the QPI interface module 11 after the training performed by the QPI interface module 11 is completed. The data check module 13 performs data check on the parallel QPI data output by the second selection module 19, and reports a check result to the BMC management module in the case of a data error.

In this embodiment, according to the operating mode of the FPGA, the second selection module 19 determines whether to send the data output by the SerDes interface module 12 to the test module or send the data to the buffer module 17, and determines whether to send the test sequence to the SerDes interface module 12 or send the QPI parallel data to the SerDes interface module 12.

Figure 7A:
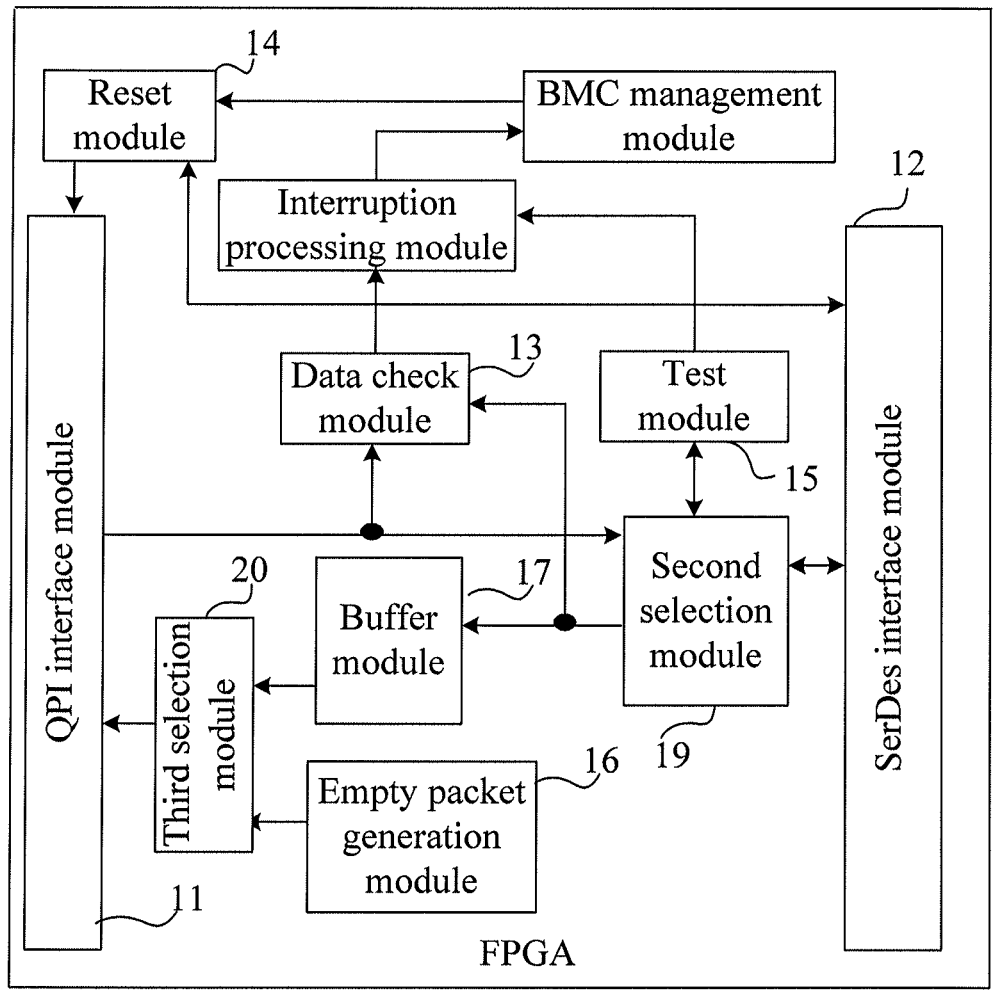
FIG. 7A is a schematic structural diagram of yet another CPU interconnect device implemented through an FPGA according to an embodiment of the present disclosure.

FIG. 7A is a schematic structural diagram of yet another CPU interconnect device implemented through the FPGA according to an embodiment of the present disclosure. As shown in FIG. 7A, the CPU interconnect device on the basis of FIG. 3A further includes: an empty packet generation module 16, a buffer module 17, a second selection module 19 and a third selection module 20.

The second selection module 19 is connected to the test module 15, the QPI interface module 11, the SerDes interface module 12, the data check module 13 and the buffer module 17. The buffer module 17 is further connected to the QPI interface module 11 and the third selection module 20. The third selection module 20 is further connected to the QPI interface module 11 and the empty packet generation module 16.

The second selection module 19 is configured to send the test sequence output by the test module to the SerDes interface module when the FPGA is in test mode, and send the parallel QPI data output by the QPI interface module to the SerDes interface module when the FPGA is in normal mode.

The second selection module 19 is further configured to send a test sequence that is from another test module and is output by the SerDes interface module to the test module when the FPGA is in test mode, and send the parallel QPI data output by the SerDes interface module to the buffer module and the data check module when the FPGA is in normal mode.

The buffer module 17 is configured to buffer the parallel QPI data output by the second selection module and send the buffered parallel QPI data to the third selection module 20 after the training performed by the QPI interface module is completed.

The data check module 13 is specifically configured to perform data check on the parallel QPI data output by the QPI interface module, and report a check result to the BMC management module in the case of a data error; and perform data check on the parallel QPI data output by the second selection module, and report a check result to the BMC management module in the case of a data error.

The third selection module 20 is further connected to the QPI interface module and the empty packet generation module, and is configured to send the parallel QPI data output by the buffer module to the QPI interface module when the FPGA is in normal mode, and send an empty packet output by the empty packet generation module to the QPI interface module when the FPGA is in test mode.

The empty packet generation module 16 is connected to the QPI interface module and is configured to generate an empty packet when the FPGA is in test mode, and output the empty packet to the third selection module. When the FPGA is in test mode, a QPI interface module on another FPGA connected to the FPGA is not connected to another CPU.

Figure 7B:
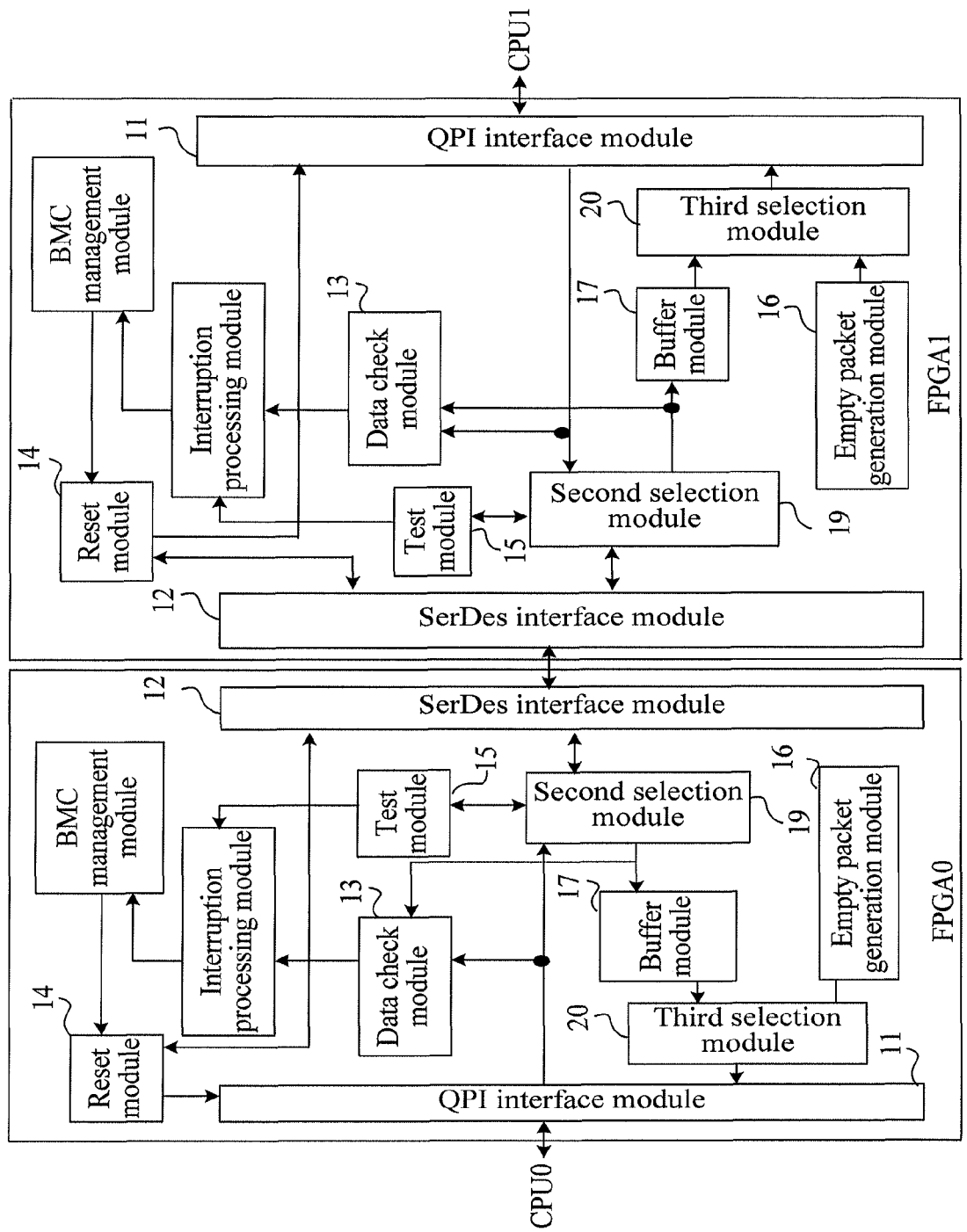
FIG. 7B is a schematic diagram illustrating the interconnection among inter-board CPUs implemented through the FPGA shown in FIG. 7A.

FIG. 7B is a schematic diagram illustrating the interconnection among inter-board CPUs implemented through the FPGA shown in FIG. 7A. As shown in FIG. 7B, on the basis of FIG. 3B, FPGA0/FPGA1 further includes an empty packet generation module 16, a buffer module 17, a second selection module 19 and a third selection module 20.

The test module 15 on FPGA0 generates a test sequence and outputs the test sequence to the second selection module 19. When determining that the FPGA0 is in test mode currently, the second selection module 19 sends the received test sequence to the SerDes interface module 12 on FPGA0. The test sequence is transmitted to the SerDes interface module 12 on FPGA1 through the SerDes interface module 12 on FPGA0, and then is transmitted to the first selection module 18 on FPGA1. When determining that the FPGA1 is in test mode currently, the second selection module 19 on FPGA1 sends the received test sequence to the test module 15 on FPGA1, and the test module 15 checks the test sequence.

The QPI interface module 11 on FPGA0 sends the output parallel QPI data to the second selection module 19 and the data check module 13, and the data check module 13 is configured to perform data check on the parallel QPI data output by the QPI interface module and report a check result to the BMC management module in the case of a data error. When determining that the FPGA0 is in normal operating mode currently, the second selection module 19 sends the received parallel QPI data to the SerDes interface module 12, and the parallel QPI data is then transmitted to the second selection module 19 on FPGA1. When determining that the FPGA1 is in normal operating mode currently, the second selection module 19 on FPGA1 sends the received parallel QPI data to the buffer module 17 and the data check module 13. The buffer module 17 buffers the parallel QPI data output by the second selection module 19, and sends the buffered parallel QPI data to the third selection module 20 on FPGA1 after the training performed by the QPI interface module 11 is completed. Meanwhile, the data check module 13 performs data check on the parallel QPI data output by the second selection module 19, and reports a check result to the BMC management module in the case of a data error.

When determining that FPGA1 is in normal mode, the third selection module 20 on FPGA1 sends the parallel QPI data output by the buffer module 17 to the QPI interface module 11. When determining that FPGA1 is in test mode, the third selection module 20 on FPGA1 sends the empty packet output by the empty packet generation module 16 to the QPI interface module.

In this embodiment, according to the operating mode of the FPGA, the second selection module 19 determines whether to send the data output by the SerDes interface module 12 to the test module or send the data to the buffer module 17, and determines whether to send the test sequence to the SerDes interface module 12 or send the QPI parallel data to the SerDes interface module 12. The third selection module 20 determines, according to the operating mode of the FPGA, whether to send the parallel QPI data output by the buffer module 17 to the QPI interface module or send the empty packet generated by the empty packet generation module to the QPI interface module.

Those of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program codes, such as a ROM, a RAM, a magnetic disk, and an optical disk.

Finally, it should be noted that the above embodiments are merely provided for describing the technical solutions of the present disclosure, but not intended to limit the present disclosure. It should be understood by persons of ordinary skill in the art that though the present disclosure has been described in detail with reference to the embodiments, modifications can be made to the technical solutions described in the embodiments, or equivalent replacements can be made to some technical features in the technical solutions, as long as such modifications or replacements do not cause the essence of the corresponding technical solutions to depart from the idea and scope of the technical solutions in the embodiments of the present disclosure.

What is claimed is:

1. A CPU interconnect device that is configured to connect to a CPU, the CPU interconnect device comprising:
   a quick path interconnect (QPI) interface; and
   a serial deserial (SerDes) interface,
   wherein:
   the QPI interface is configured to receive first serial QPI data from the CPU, convert the received first serial QPI data into first parallel QPI data, and output the first parallel QPI data to the SerDes interface; and
   the SerDes interface is configured to convert the first parallel QPI data output by the QPI interface into a first high-speed serial SerDes data and then communicate the first high-speed serial SerDes data to another CPU interconnect device connected with a second CPU;
   the SerDes interface is further configured to receive a second high-speed serial SerDes data from the other CPU interconnect device, convert the received second high-speed serial SerDes data into second parallel QPI data, and output the second parallel QPI data to the QPI interface; and
   the QPI interface is further configured to convert the second parallel QPI data output by the SerDes interface into a second serial QPI data and then send the second serial QPI data to the first CPU.

2. The CPU interconnect device according to claim 1, further comprising:
   a data check module configured to perform data check on the first parallel QPI data output by the QPI interface and the second parallel QPI data output by the SerDes interface, and report a check result to a Baseboard Manage Controller (BMC) in the case of error of any one of the first parallel QPI data and the second parallel QPI data; and
   a reset module configured to receive a reset instruction that is given by the BMC according to the check result reported by the data check module, and then reset the QPI interface or the SerDes interface according to the reset instruction.

3. The CPU interconnect device according to claim 2, further comprising:
   a test module configured to:
   generate a first test sequence when the CPU interconnect device is in a test mode,
   send the generated first test sequence to the other CPU interconnect device through the SerDes interface and another SerDes interface of the another CPU interconnect device,
   receive a second test sequence through the SerDes interface and from the another CPU interconnect device, and
   perform data check on the received second test sequence.

4. The CPU interconnect device according to claim 2, comprising:
   an empty packet generation module configured to generate an empty packet when the CPU interconnect device is in a test mode and output the empty packet to the QPI interface.

5. The CPU interconnect device according to claim 1, wherein the QPI interface is configured to periodically perform data training, so that an edge of a forwarded clock of the CPU interconnect device is centered on each sent serial QPI data lane; and
   wherein the interconnect device further comprises a buffer module configured to buffer the second parallel QPI data output by the SerDes interface, and send the buffered second parallel QPI data to the QPI interface after the training performed by the QPI interface is completed.

6. The CPU interconnect device according to claim 3, further comprising:
   an interruption processing module that is connected to the test module and the data check module, wherein the data check module reports the check result to the BMC management module through the interruption processing module in the case of a data error; and the test module reports a test result to the BMC management module through the interruption processing module when determining that an error occurs in the received test sequence.

7. The CPU interconnect device according to claim 3, comprising:
   a first selection module configured to determine a work mode of the CPU interconnect device, send the first test sequence output by the test module to the SerDes interface when the CPU interconnect device is in the test mode, and send the first parallel QPI data output by the QPI interface to the SerDes interface when the CPU interconnect device is in a normal mode.

8. The CPU interconnect device according to claim 7, wherein the first selection module is configured to send the second test sequence from the other CPU interconnect device to the test module when the CPU interconnect device is in the test mode, and send the second parallel QPI data output by the SerDes interface to the QPI interface and the data check module when the CPU interconnect device is in the normal mode.

9. The CPU interconnect device according to claim 4, further comprising:
   a third selection module configured to send an empty packet generated by the empty packet generation module to the QPI interface when the CPU interconnect device is in test mode.

10. A computer system for CPUs interconnection, comprising:
    a first CPU, a second CPU, a first CPU interconnect device, and a second CPU interconnect device, the first CPU interconnect device comprises a first quick path interconnect (QPI) interface and a first serial deserial (SerDes) interface that are connected to each other, the second CPU interconnect device comprises a second QPI interface and a second SerDes interface that are connected to each other; wherein:

the first CPU connects with the first QPI interface, the second CPU connects with the second QPI interface, and the first SerDes interface connects with the second SerDes interface;

the first QPI interface is configured to receive a first serial QPI data from the first CPU, convert the received first serial QPI data into a first parallel QPI data, and output the first parallel QPI data to the first SerDes interface;

the first SerDes interface is configured to convert the first parallel QPI data output by the QPI interface into a first high-speed serial SerDes data and then communicate the first high-speed serial SerDes data to the second SerDes interface;

the second SerDes interface is configured to receive the first high-speed serial SerDes data from the first SerDes interface, convert the first high-speed serial SerDes data into the first parallel QPI data, and output the first parallel QPI data to the second QPI interface; and the second QPI interface is configured to receive the first parallel QPI data from the second SerDes interface, convert the first parallel QPI data into the first serial QPI data, and communicate the first parallel QPI data to the second CPU.

* * * * *